(12) United States Patent
Nagasawa

(10) Patent No.: US 12,358,459 B2
(45) Date of Patent: Jul. 15, 2025

(54) AIRBAG APPARATUS

(71) Applicant: SUBARU CORPORATION, Tokyo (JP)

(72) Inventor: Isamu Nagasawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/649,426

(22) Filed: Apr. 29, 2024

(65) Prior Publication Data

US 2024/0391412 A1 Nov. 28, 2024

(30) Foreign Application Priority Data

May 24, 2023 (JP) .................................. 2023-085470

(51) Int. Cl.
*B60R 21/013* (2006.01)
*B60R 21/205* (2011.01)
(Continued)

(52) U.S. Cl.
CPC .......... *B60R 21/231* (2013.01); *B60R 21/013* (2013.01); *B60R 21/205* (2013.01);
(Continued)

(58) Field of Classification Search
CPC ... B60R 21/231; B60R 21/013; B60R 21/233; B60R 21/206; B60R 21/205; B60R 21/239; B60R 21/207; B60R 2021/23107; B60R 2021/23169; B60R 2021/23308; B60R 2021/23316; B60R 2021/23324; B60R 2021/23332; B60R 2021/23153; B60R 2021/0051; B60R 2021/0004;
(Continued)

(56) References Cited

U.S. PATENT DOCUMENTS 3,784,225 A * 1/1974 Fleck ..................... B60R 21/231
280/729
4,076,277 A * 2/1978 Kuwakado ............ B60R 21/231
280/743.1
(Continued)

FOREIGN PATENT DOCUMENTS

JP S47-43142 Y 12/1972
JP S49-92729 A 9/1974
(Continued)

*Primary Examiner* — Keith J Frisby
(74) *Attorney, Agent, or Firm* — Smith, Gambrell & Russell, LLP

(57) ABSTRACT

An airbag apparatus includes an airbag, a collision detector, and a deploying-gas supplier. The airbag is configured to be deployed in front of an occupant sitting in a seat of a vehicle. The collision detector includes a sensor and is configured to detect an occurrence or sign of a collision of the vehicle. The deploying-gas supplier is configured to supply deploying gas into the airbag based on an output of the collision detector. The airbag includes a lower-half-restraining bag and upper-half-restraining bags. The lower-half-restraining bag is configured to be deployed in front of knees of the occupant. The upper-half-restraining bags are configured to be deployed between the lower-half-restraining bag and an upper body of the occupant and in a plane that faces the upper body.

11 Claims, 6 Drawing Sheets

(51) Int. Cl.
  *B60R 21/206* (2011.01)
  *B60R 21/231* (2011.01)
  *B60R 21/233* (2006.01)
(52) U.S. Cl.
  CPC .......... *B60R 21/206* (2013.01); *B60R 21/233* (2013.01); *B60R 2021/23107* (2013.01); *B60R 2021/23169* (2013.01); *B60R 2021/23308* (2013.01); *B60R 2021/23324* (2013.01)
(58) Field of Classification Search
  CPC .... B60R 2021/0048; B60R 2021/0044; B60R 2021/0053; B60R 2021/2615
  USPC .......................... 280/743.1, 729, 732, 728.1
  See application file for complete search history.

(56) References Cited

U.S. PATENT DOCUMENTS

| | | | | |
|---|---|---|---|---|
| 11,173,866 | B2 * | 11/2021 | Deng | B60R 21/233 |
| 11,225,216 | B1 * | 1/2022 | Lin | B60R 21/207 |
| 11,904,787 | B1 * | 2/2024 | Chavez | B60R 21/215 |
| 2009/0121462 | A1 * | 5/2009 | Rick | B60R 21/206 |
| | | | | 280/729 |
| 2011/0285114 | A1 * | 11/2011 | Ohara | B60R 21/2338 |
| | | | | 280/730.1 |
| 2012/0025498 | A1 * | 2/2012 | Tanaka | B60R 21/233 |
| | | | | 280/730.2 |
| 2013/0127142 | A1 * | 5/2013 | Fukawatase | B60R 21/205 |
| | | | | 280/743.1 |
| 2019/0337478 | A1 * | 11/2019 | Schneider | B60R 21/214 |
| 2021/0031718 | A1 * | 2/2021 | Schultz | B60R 21/231 |
| 2022/0340098 | A1 * | 10/2022 | Zhou | B60R 21/239 |
| 2022/0348160 | A1 * | 11/2022 | Faruque | B60R 21/233 |
| 2023/0256927 | A1 * | 8/2023 | Nagasawa | B60N 2/002 |
| | | | | 280/728.1 |

FOREIGN PATENT DOCUMENTS

| | | | | |
|---|---|---|---|---|
| JP | 2003182500 A | * | 7/2003 | .......... B60R 21/231 |
| JP | 2006-88902 A | | 4/2006 | |
| JP | 2008149965 A | * | 7/2008 | |
| JP | 2017213995 A | * | 12/2017 | |
| WO | WO-2024127914 A1 | * | 6/2024 | |

* cited by examiner

AIRBAG APPARATUS

CROSS-REFERENCE TO RELATED APPLICATIONS

The present application claims priority from Japanese Patent Application No. 2023-085470 filed on May 24, 2023, the entire contents of which are hereby incorporated by reference.

BACKGROUND

The disclosure relates to an airbag apparatus intended for vehicles.

An exemplary airbag apparatus disclosed as a rear-seat airbag apparatus in Japanese Unexamined Patent Application Publication No. 2006-88902 is intended to protect an occupant in a rear seat regardless of variations in the distance from the occupant in the rear seat to a seat in front of the occupant. The airbag apparatus includes an airbag to be inflated and deployed between the front seat and the rear seat in such a manner as to protect the occupant, and an auxiliary airbag to be inflated and deployed between the airbag and the front seat. The airbag and the auxiliary airbag are inflated to be deployed with the supply of gas from a first inflator and a second inflator. The deployment of the auxiliary airbag is controlled by a control device such that the auxiliary airbag is not inflated to be deployed when the distance from the occupant to the front seat is short but is inflated to be deployed when the distance is long.

A two-part-airbag safety apparatus disclosed in Japanese Unexamined Patent Application Publication No. S49-92729 includes an airbag main part that protects the lower half of an occupant's body, and a separate airbag part that protects the occupant's head. The airbag main part and the separate airbag part communicate with each other through a vent port. Gas is to be supplied into the airbag main part and then flow through the vent port into the separate airbag part.

An apparatus disclosed in Japanese Examined Utility Model Registration Application Publication No. S47-43142 includes a spherical airbag intended to protect the upper half of an occupant's body and disposed at an upper portion of the back of a front seat, and a spherical airbag intended to protect the lower half of the occupant's body and disposed at a lower portion of the back of the front seat.

SUMMARY

An aspect of the disclosure provides an airbag apparatus to be applied to a vehicle. The airbag apparatus includes an airbag, a collision detector, and a deploying-gas supplier. The airbag is configured to be deployed in front of an occupant sitting in a seat of the vehicle. The collision detector includes a sensor and is configured to detect an occurrence or sign of a collision of the vehicle. The deploying-gas supplier is configured to supply deploying gas into the airbag based on an output of the collision detector. The airbag includes a lower-half-restraining bag and upper-half-restraining bags. The lower-half-restraining bag is configured to be deployed in front of knees of the occupant. The upper-half-restraining bags are configured to be deployed between the lower-half-restraining bag and an upper body of the occupant and in a plane that faces the upper body.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

In an existing technique regarding a safety apparatus configured to protect the upper-half body of an occupant in a rear seat (a seat in any of the second and subsequent rows) of a vehicle in the event of a head-on collision of the vehicle, the energy of the collision is to be absorbed by deploying an airbag with the aid of a reaction force exerted by the backrest part of a seat in front of the occupant.

In such a technique, however, the relationship between the airbag and the occupant in the rear seat varies with the position of the front seat and the angle of the backrest part of the front seat. Consequently, occupant restrainability may become unstable.

In view of the above, it is desirable to provide an airbag apparatus configured to obtain a stable reaction force even in a case where the positional relationship between the occupant and a seat in front varies.

An airbag apparatus according to an embodiment of the disclosure will now be described. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

The airbag apparatus according to the embodiment is intended for a rear-row seat of a vehicle such as a passenger car.

In this specification and other relevant materials, the term "rear-row seat" generally refers to any seat in the second and subsequent seat rows that are arranged one after another in the front-rear direction.

Figure 1:
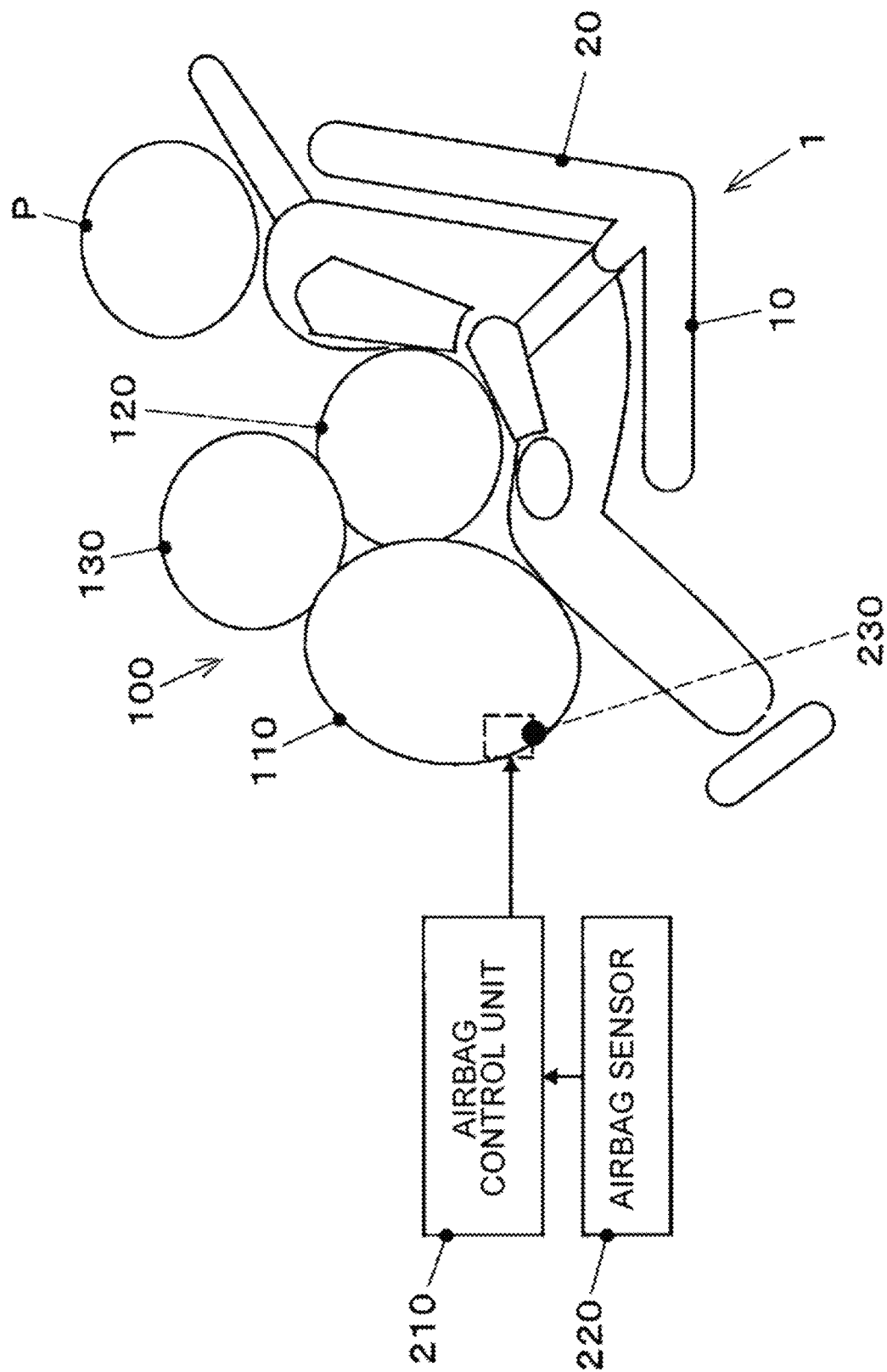
FIG. 1 is a schematic side view of an airbag apparatus according to an embodiment that is in a deployed state.

FIG. 1 is a schematic side view of the airbag apparatus according to the embodiment that is in a deployed state.

An occupant P to be restrained by the airbag apparatus is sitting in a rear-row seat 1.

In front of the rear-row seat 1 is disposed the backrest of a seat in front (not illustrated).

The rear-row seat 1 includes a seat cushion 10 and a backrest 20.

The seat cushion 10 is to receive the lumbar and femoral regions of the occupant P.

The backrest 20 is positioned to face the back of the occupant P.

The backrest 20 extends upward from near the rear end of the seat cushion 10.

The airbag apparatus includes an airbag 100, an airbag control unit 210, an airbag sensor 220, and an inflator 230.

The airbag 100 includes multiple bag members each being made of, for example, nylon-based foundation-fabric panels that are sewn together into a bag form.

When the airbag 100 is not in use (yet to be deployed), the airbag 100 is folded and housed in a retainer disposed in the backrest of the seat in front.

When deploying gas G is supplied from the inflator 230 into the airbag 100, the airbag 100 is deployed in front of the occupant P.

The airbag 100 includes a lower-half-restraining bag 110 and an upper-half-restraining airbag group. The upper-half-restraining airbag group includes a lower bag 120, a left bag 130, and a right bag 140.

Figure 2:
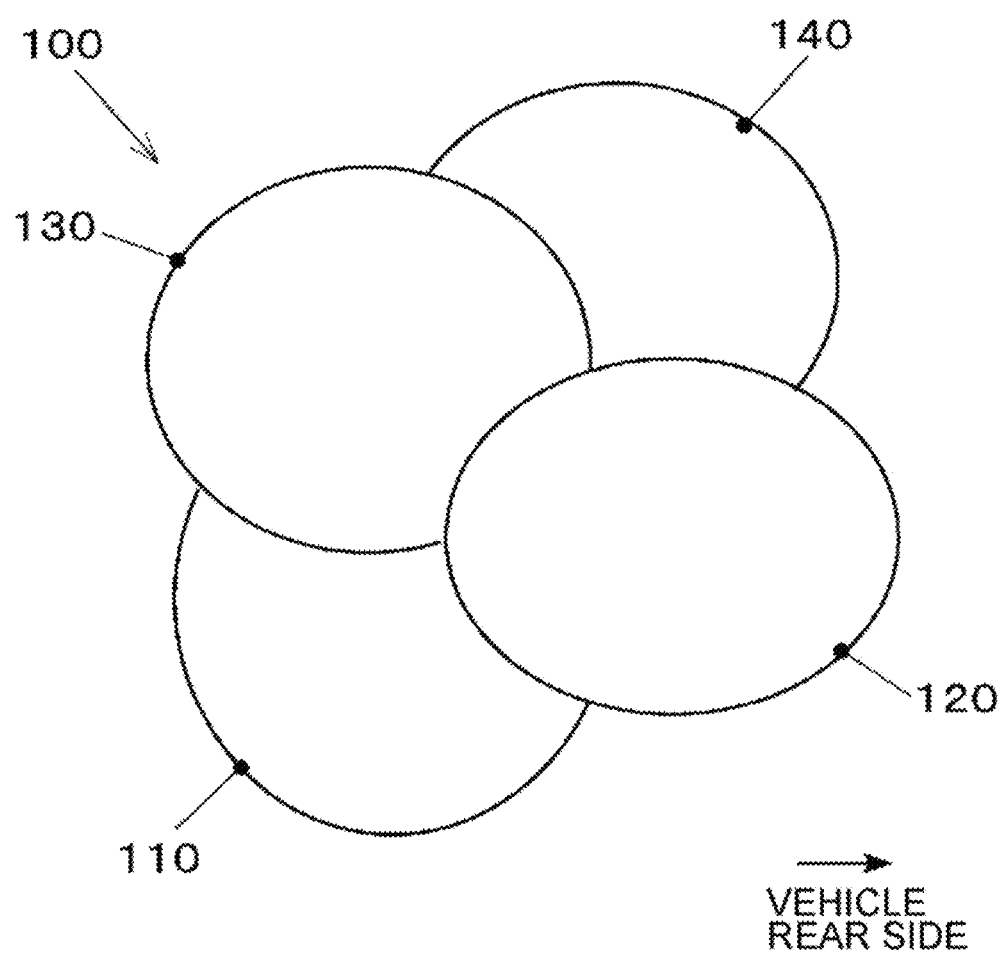
FIG. 2 illustrates an airbag according to the embodiment that is seen from the vehicle rear side (occupant side)

FIG. 2 illustrates the airbag 100 that is seen from the vehicle rear side (occupant side).

Figure 3:
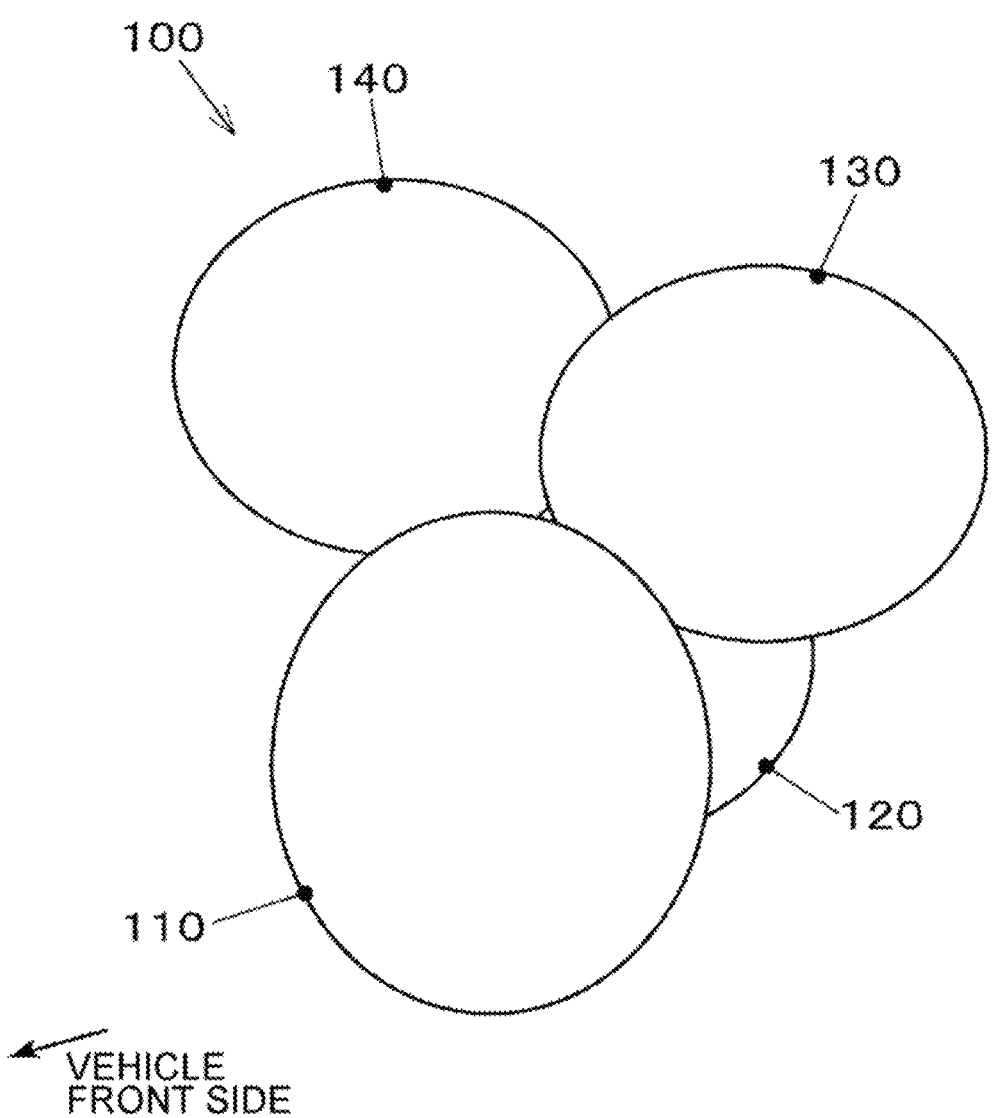
FIG. 3 illustrates the airbag according to the embodiment that is seen from the vehicle front side (front-seat side)

FIG. 3 illustrates the airbag 100 that is seen from the vehicle front side (front-seat side).

The lower-half-restraining bag 110 is to be deployed in front of the knees of the occupant P.

A lower end portion of the lower-half-restraining bag 110 is coupled to the inflator 230, which is disposed in the backrest of the front-row seat.

The coupling part between the lower-half-restraining bag 110 and the inflator 230 serves as a support for the lower-half-restraining bag 110.

After the lower-half-restraining bag 110 is deployed, the lower-half-restraining bag 110 has a rotatable oval shape with the rotation axis (the major axis of the oval) extending in the top-bottom direction.

The upper-half-restraining airbag group is attached to a vehicle-rear-side portion of the lower-half-restraining bag 110.

The upper-half-restraining airbag group is to be deployed in a plane that faces the upper body of the occupant P.

The lower bag 120 is disposed at a lower position among the upper-half-restraining airbag group and is to be deployed in front of the abdomen and lumbar regions of the occupant P.

The left bag 130 and the right bag 140 are to be deployed on the upper left and right sides, respectively, relative to the lower bag 120.

The left bag 130 is to be deployed in front of the left shoulder of the occupant P.

The right bag 140 is to be deployed in front of the right shoulder of the occupant P.

The lower bag 120, the left bag 130, and the right bag 140 are each designed to have a spherical shape after being deployed.

The airbag control unit 210 is configured to control the deployment of the airbag 100 by controlling the inflator 230 based on the output of the airbag sensor 220.

The airbag control unit 210 may be configured as a microcomputer including, for example, an information processor such as a central processing unit (CPU), a storage such as a random access memory (RAM) or a read-only memory (ROM), an input/output interface, and a bus that couples the foregoing elements to each other.

The airbag sensor 220 is a sensor, such as an acceleration sensor, configured to detect the occurrence of a head-on collision of the vehicle.

When an acceleration of a predetermined level or higher acts on the vehicle body, the airbag control unit 210 determines that a collision has occurred based on the output of the airbag sensor 220 and activates the inflator 230.

The inflator 230 serves as a deploying-gas supplier. When the airbag control unit 210 has determined that a collision has occurred, the inflator 230 generates deploying gas G and introduces the deploying gas G into the airbag 100.

The inflator 230 includes, for example, a chemical gas generator.

Figure 4:
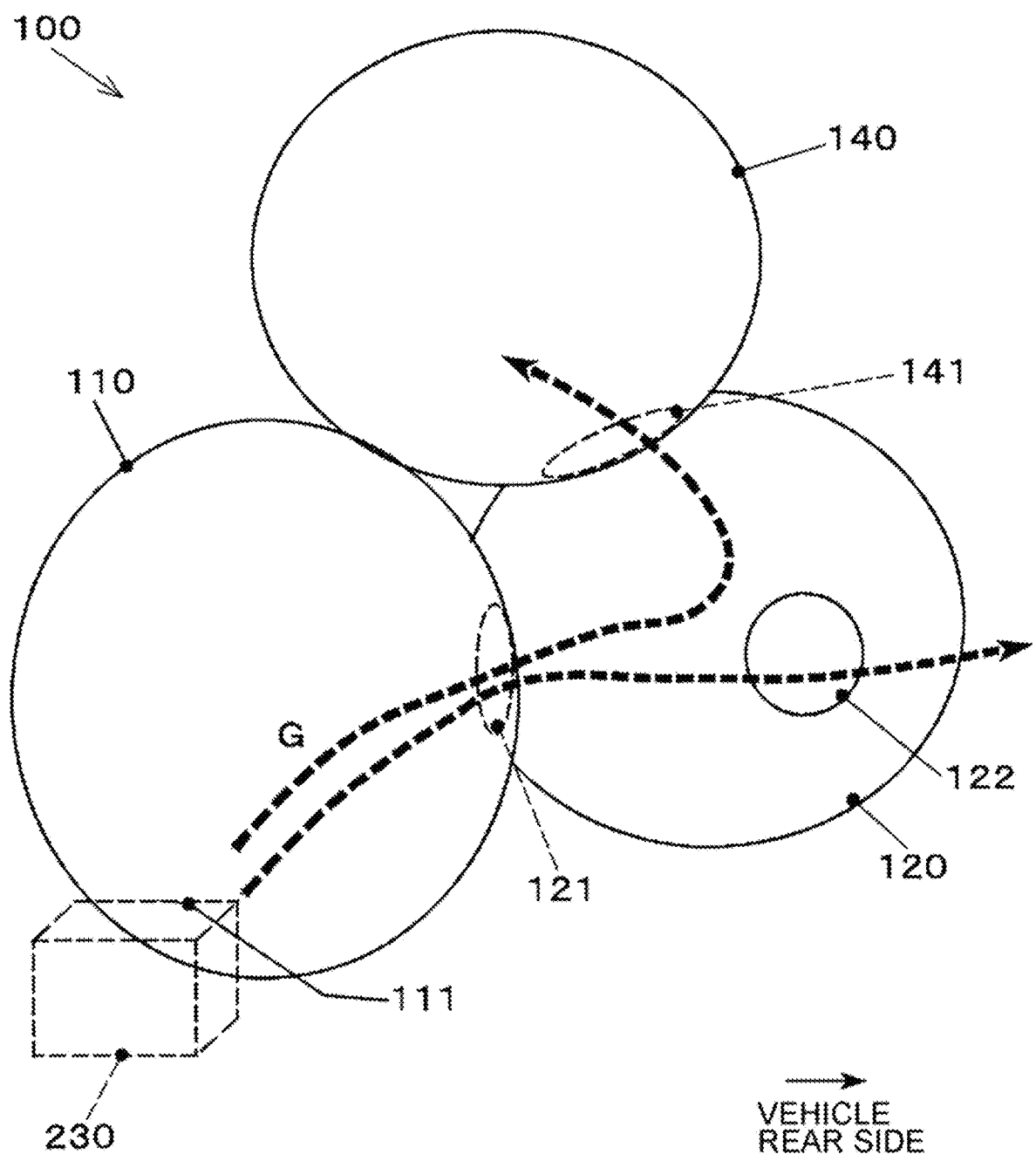
FIG. 4 illustrates how deploying gas flows in the airbag according to the embodiment.

FIG. 4 illustrates how deploying gas G flows in the airbag 100.

The left bag 130, which is not illustrated in FIG. 4, is bilaterally symmetrical to the right bag 140.

The inflator 230 is configured to introduce the deploying gas G into a gas introduction port 111, which is disposed at a front part of the lower end portion of the lower-half-restraining bag 110.

At the joint between the lower-half-restraining bag 110 and the lower bag 120 is disposed a gas introduction port 121, through which the deploying gas G is to be introduced from the lower-half-restraining bag 110 into the lower bag 120.

No passageway for the deploying gas G is provided at the joint between the lower-half-restraining bag 110 and each of the right bag 140 and the left bag 130.

The lower bag 120 has a vent hole 122, through which an excessive portion of the deploying gas G is to be released to the outside (into the vehicle cabin).

At the joint between the lower bag 120 and the right bag 140 is disposed a gas introduction port 141, through which the deploying gas G is to be introduced from the lower bag 120 into the right bag 140.

The right bag 140 is to be supplied with the deploying gas G through the lower bag 120 (this also applies to the left bag 130).

No passageway for the deploying gas G is provided at the joint between the right bag 140 and the left bag 130.

The right bag 140 and the left bag 130 communicate with each other through the inside of the lower bag 120.

Figure 5:
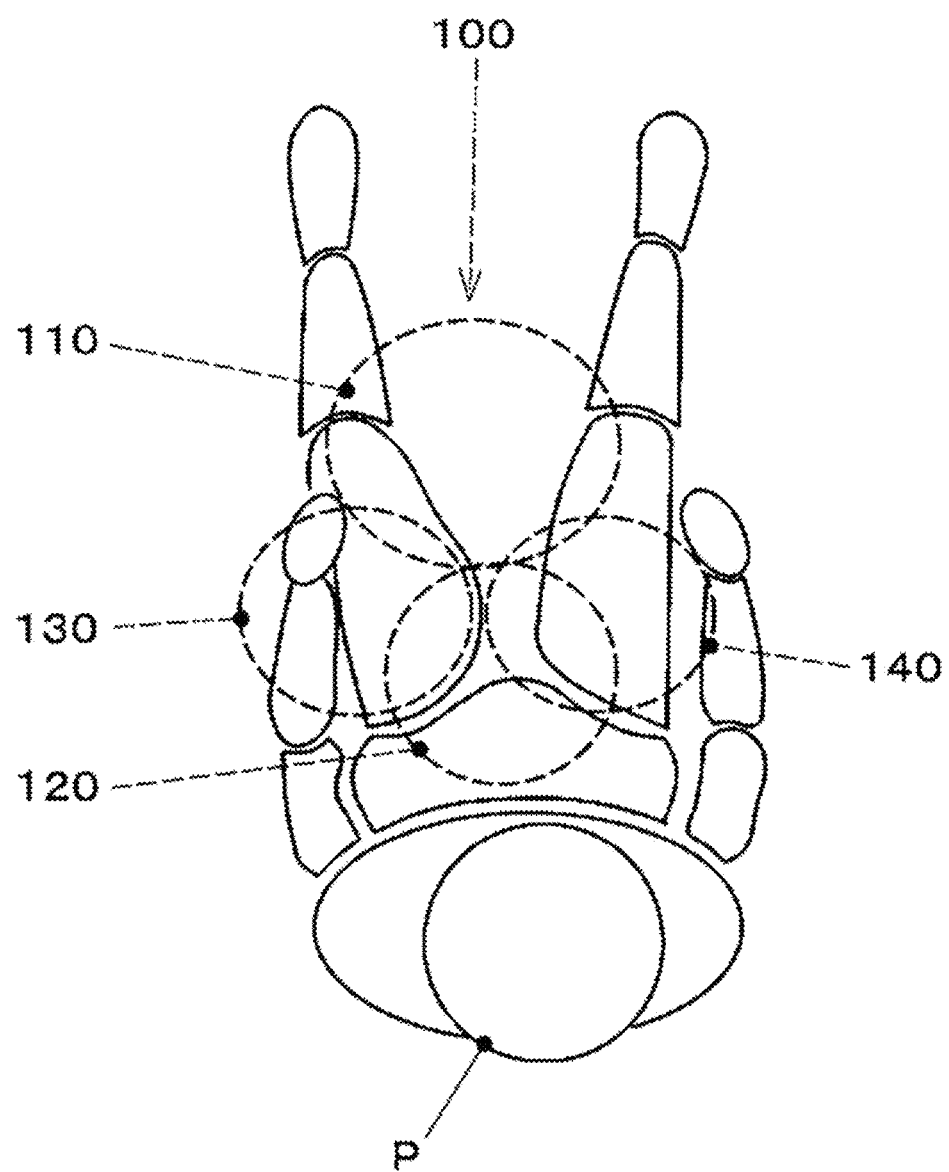
FIG. 5 illustrates the airbag according to the embodiment that has been deployed in front of an occupant facing frontward.

FIG. 5 illustrates the airbag 100 according to the embodiment that has been deployed in front of the occupant P, who is facing frontward.

In the state illustrated in FIG. 5, the occupant P straightly faces the airbag 100, so that the head of the occupant P is restrained between an upper portion of the left bag 130 and an upper portion of the right bag 140.

The right shoulder and the left shoulder of the occupant P are evenly supported and restrained by the left bag 130 and the right bag 140, respectively.

Figure 6:
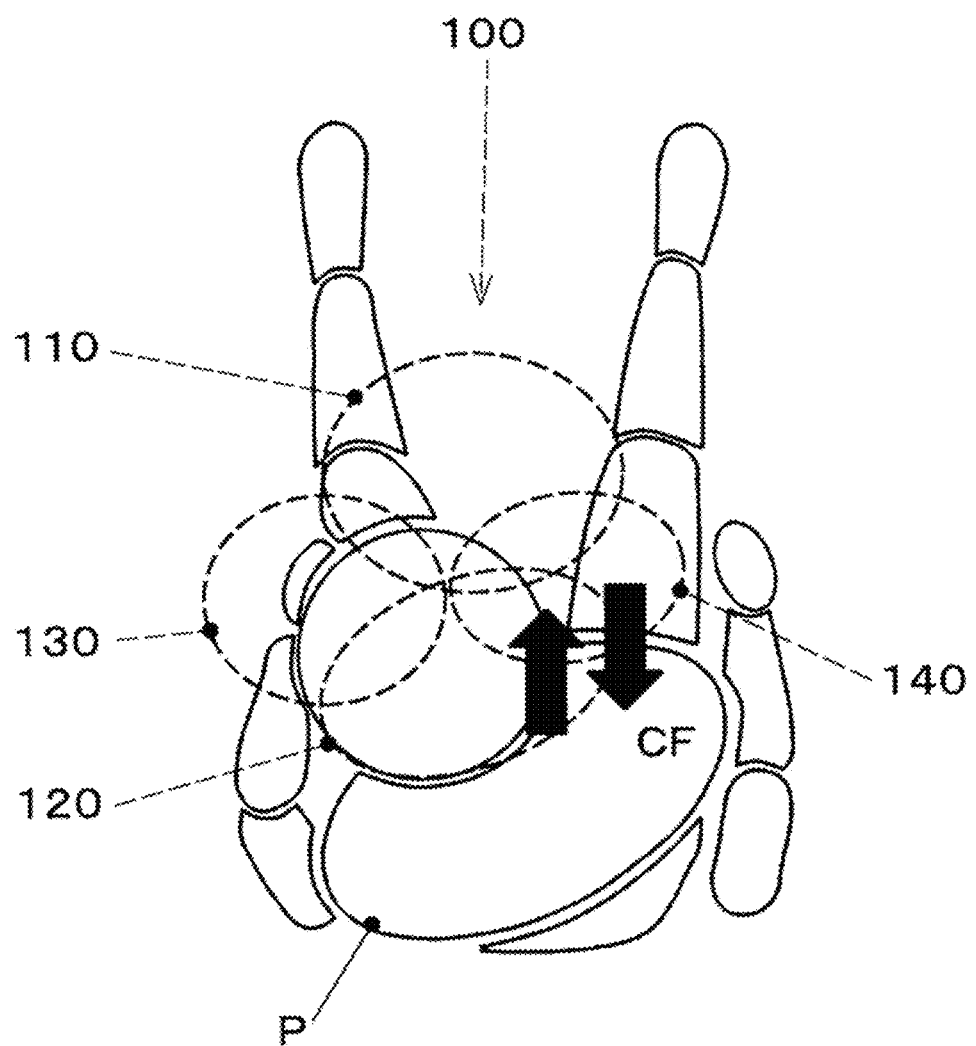
FIG. 6 illustrates the airbag according to the embodiment that has been deployed in front of the occupant, with the body of the occupant yawing leftward.

FIG. 6 illustrates the airbag 100 according to the embodiment that has been deployed in front of the occupant P, with the body of the occupant P yawing leftward.

In the state illustrated in FIG. 6, the upper body of the occupant P is moving such that the right shoulder is rotated frontward, and the head of the occupant P is tilted leftward.

Accordingly, the right bag 140 is strongly pushed frontward relative to the left bag 130. Since the right bag 140 and the left bag 130 do not directly communicate with each other, the internal pressure of the right bag 140 increases.

In response to the increase in the internal pressure of the right bag 140, the right bag 140 exerts a reaction force CF, which restrains the right shoulder of the occupant P with an increased strength.

According to the above embodiment, the following effects are produced.

(1) The airbag 100 includes the lower-half-restraining bag 110 to be deployed in front of the knees of the occupant P; and the multiple upper-half-restraining airbags 120, 130, and 140 to be deployed between the lower-half-restraining bag 110 and the upper body of the occupant P and in a plane that faces the upper body. Therefore, the lower-half-restraining bag 110 and the upper-half-restraining airbags 120, 130, and 140 are to receive a reaction force while being positioned between the upper body and the knees of the occupant P. Thus, a stable reaction force is obtained regardless of the positional relationship between the occupant P and another seat (a seat in front) disposed in front of the seat 1. Consequently, the occupant restrainability is increased.

(2) The upper-half-restraining bags include the left bag 130 and the right bag 130 to be deployed side by side in the left-right direction; and the lower bag 120 to be deployed below the left bag 130 and the right bag 140. Therefore, the upper body of the occupant P is to be restrained with increased effectiveness and a simple structure.

(3) The lower bag 120 is to be supplied with the deploying gas G through the lower-half-restraining bag 110, and the left bag 130 and the right bag 140 are to be supplied with the deploying gas G through the lower bag 120. Therefore, when the airbag 100 is deployed, the lower-half-restraining bag 110 and the lower bag 120 are first deployed to restrain the abdomen and pelvic regions of the occupant P. Thus, the movement of the upper-half body of the occupant P is stabilized.

(4) The left bag 130 and the right bag 140 communicate with each other through the inside of the lower bag 120. Therefore, when the upper body of the occupant P yaws, an increased reaction force is generated by a corresponding one of the left bag 130 and the right bag 140 to restrain a corresponding one of the shoulders of the occupant P.

(5) The lower bag 120, the left bag 130, and the right bag 140 are each designed to have a spherical shape. Thus, the above effects are produced appropriately with a simple structure.

Modifications

The disclosure is not limited to the above embodiment. Various modifications and changes can be made to the embodiment. Such modifications and changes are also within the technical scope of the disclosure.

(1) The shapes, structures, materials, production methods, arrangements, quantities, and other relevant factors of the elements forming the airbag apparatus, the vehicle seat, and the vehicle are not limited to those employed by the above embodiment and may be changed as appropriate.

(2) While the above embodiment employs, for example, three upper-half-restraining airbags, the quantity and arrangement of the upper-half-restraining airbags are not particularly limited and may be changed as appropriate.

(3) While the above embodiment employs a configuration in which the airbag is to be deployed by using a single inflator, the disclosure is not limited to such an embodiment. Multiple inflators may be employed.

The invention claimed is:

1. An airbag apparatus to be applied to a vehicle, the airbag apparatus comprising:
   an airbag configured to be deployed in front of an occupant sitting in a seat of the vehicle;
   a collision detector comprising a sensor and configured to detect an occurrence or sign of a collision of the vehicle; and
   a deploying-gas supplier configured to supply deploying gas into the airbag based on an output of the collision detector,
   wherein the airbag comprises
      a lower-half-restraining bag configured to be deployed in front of knees of the occupant; and
      upper-half-restraining bags configured to be deployed between the lower-half-restraining bag and an upper body of the occupant and in a plane that faces the upper body, and wherein the upper-half-restraining bags comprise
      a left bag and a right bag configured to be deployed side by side in a left-right direction; and
      a lower bag configured to be deployed below the left bag and the right bag and more rearward of the left bag and the right bag.

2. The airbag apparatus according to claim 1,
   wherein the lower bag is configured to be supplied with the deploying gas through the lower-half-restraining bag, and
   wherein the left bag and the right bag are configured to be supplied with the deploying gas through the lower bag.

3. The airbag apparatus according to claim 2,
   wherein the left bag and the right bag communicate with each other through an inside of the lower bag.

4. The airbag apparatus according to claim 1,
   wherein the left bag and the right bag communicate with each other through an inside of the lower bag.

5. The airbag apparatus according to claim 1,
   wherein the upper-half-restraining bags are each designed to have a spherical shape.

6. An airbag apparatus to be applied to a vehicle, the airbag apparatus comprising:
   an airbag configured to be deployed in front of an occupant sitting in a seat of the vehicle;
   a collision detector comprising a sensor and configured to detect an occurrence or sign of a collision of the vehicle; and
   a deploying-gas supplier configured to supply deploying gas into the airbag based on an output of the collision detector,
   wherein the airbag comprises
      a lower-half-restraining bag configured to be deployed in front of knees of the occupant; and
      upper-half-restraining bags configured to be deployed between the lower-half-restraining bag and an upper body of the occupant and in a plane that faces the upper body, and
   wherein the upper-half-restraining bags are each designed to have a spherical shape.

7. The airbag apparatus according to claim 6,
   wherein the upper-half-restraining bags comprise
      a left bag and a right bag configured to be deployed side by side in a left-right direction; and
      a lower bag configured to be deployed below the left bag and the right bag.

8. An airbag apparatus to be applied to a vehicle, the airbag apparatus comprising:
   an airbag configured to be deployed in front of an occupant sitting in a seat of the vehicle;
   a collision detector comprising a sensor and configured to detect an occurrence or sign of a collision of the vehicle; and
   a deploying-gas supplier configured to supply deploying gas into the airbag based on an output of the collision detector,
   wherein the airbag comprises a lower-half-restraining bag configured to be deployed in front of knees of the occupant; and upper-half-restraining bags configured to be deployed between the lower-half-restraining bag and an upper body of the occupant and in a plane that faces the upper body, and wherein the lower-half-restraining bag has an oval shape with the major axis of that oval shape extending in the top-to-bottom direction.

9. The airbag apparatus according to claim 8, wherein the upper-half-restraining bags are each designed to have a spherical shape.

10. The airbag apparatus according to claim 8, wherein the upper-half-restraining bags comprise a left bag and a right bag configured to be deployed side by side in a left-right direction; and a lower bag configured to be deployed below the left bag and the right bag.

11. The airbag apparatus according to claim 10, wherein the lower bag is configured to be deployed more rearward than the left bag and the right bag.

\* \* \* \* \*